*Kendall & Hunt,*
*Making Wood Screws,*
Nº 21,641.
Patented Sept. 28, 1858.
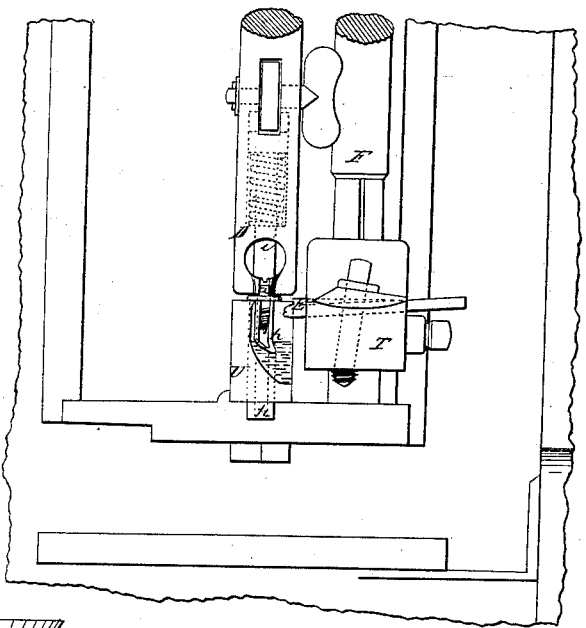
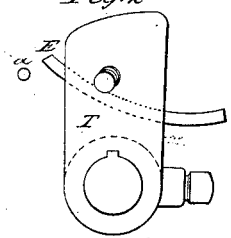
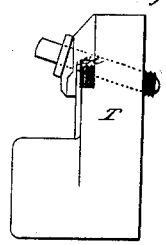
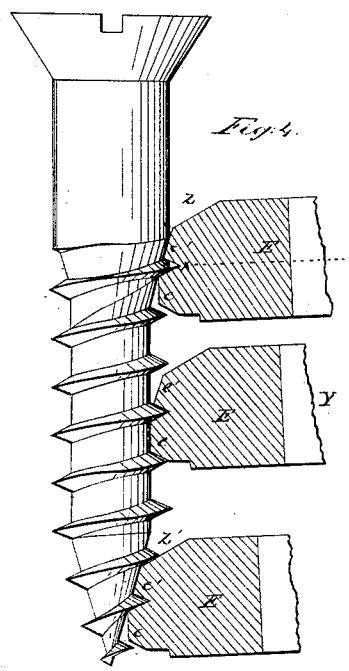

UNITED STATES PATENT OFFICE.

HENRY L. KENDALL AND HOMER P. HUNT, OF PROVIDENCE, RHODE ISLAND, ASSIGNORS TO THE NEW ENGLAND SCREW COMPANY.

IMPROVEMENT IN CUTTING THREADS OF WOOD-SCREWS.

Specification forming part of Letters Patent No. 21,641, dated September 28, 1858.

*To all whom it may concern:*

Be it known that we, HENRY L. KENDALL and HOMER P. HUNT, of the city and county of Providence, and State of Rhode Island, have invented a new and useful Improvement in Machinery for Cutting the Threads of Wood-Screws, of which the following is a full, clear, and exact description, reference being had to the accompanying drawings, in which—

Figure 1 represents an elevation of a portion of a screw-cutting machine with our improvement applied thereto. Fig. 2 is a view of the tool-post and tool of the said machine detached from the machine. Fig. 3 is a side view of the same; and Fig. 4 represents an enlarged view of a screw with the tool represented as operating at different parts thereof.

Our invention has reference to that class of machines by means of which the thread is cut upon wood-screws by a chasing-tool which removes successive shavings of metal, in contradistinction to machines in which the screw is cut by means of dies.

Previous to our invention it has been customary to cut wood-screws tapering at the point, and tapering also where the core vanishes into the stem of the screw, by means of a single chasing-tool, whose profile determines the form of the core and threads, and which is advanced more or less toward the axis of the screw while the latter is being cut, as it is desired to make the extremities of the core more or less tapering. In this mode of cutting screws the tapering portions of the screw and the body thereof between the tapering portions are cut by the same cutting-edge, and hence the profile of the tapering portions of the screw is the same as that of the body thereof, but of greater or less depth, and the core of the screw vanishes into the stem thereof and tapers to a point in the form of a volute, the profiles of whose convolutions are parallel with those of the core at the body of the screw between the tapering portions.

The object of our invention is to produce wood-screws tapering with a slope at the point, and tapering with a slope also where the core vanishes into the stem of the screw, so that the profiles of the convolutions of the tapering portions shall slope toward the point and be inclined to those of the core at the body of the screw between the tapering portions thereof.

Our invention consists in cutting the thread of such screws by means of two cutting-edges upon the chasing tool or tools, which edges are caused by suitable mechanism to operate successively upon the screw, the one edge having a form adapted to cutting the thread upon the body of the screw between the sloping extremities of the core, and the other cutting-edge having a form adapted to cutting the thread upon the sloping extremities of of the core.

Our invention may be adapted to machines now in use for cutting wood-screws—as, for example, to the machine devised by Cullen Whipple, of Providence, Rhode Island, for that purpose.

The accompanying drawings represent a portion of such a machine with our improvement applied thereto. In this example the screw-blank $a$ is gripped in a tubular holder D, which has an opening in its extremity of a suitable size and form to hold the screw-blank firmly. It is maintained in this holder by means of the sliding bolt $i$, whose extremity terminates in a tongue which fits into the nick in the head of the screw, so as to cause it to revolve upon its axis with the holder in which it is gripped. The stem of the screw projects from the holder and is received into a rest V, which is lined with a steel tube $h$ having an opening at its side to permit the cutting-tool to act upon the screw-blank. The tool E is secured in a tool-post T, which is caused by suitable mechanism to carry the tool lengthwise to and fro along the screw, and also to advance it crosswise toward the axis of the screw and withdraw it therefrom, while the screw is revolving in the rest. These movements may be imparted to the tool-post by means of cams operating upon the shaft F to which the tool-post is secured; but as our invention is limited to the cutting-tool, we do not deem it necessary to describe particularly the means of imparting motion to the tool and to the screw, especially as means of imparting these motions are well known to manufacturers of wood-screw machinery and are in daily use.

In the present example our invention is embodied in a tool E, formed of a single piece of metal, which, as shown at Figs. 1, 2, and 3, has a curved form longitudinally, while its cross-section is adapted to the size and peculiar form of the screw to be cut. The cutting-edge of this tool, as shown at Fig. 4, consists of a combination of two cutting-edges $e$ and $e'$, adjoining at the dotted line $x\,x$. One of these cutting-edges $e$ has a profile which is the counterpart of that of the body of the screw between the sloping extremities of the threaded portion, as shown at Y, Fig. 4. The other cutting-edge $e'$ has a profile which is the counterpart of that of the sloping portions of the screw, as shown at Z Z', Fig. 4.

In order to form such tools, I construct a ring of square steel and turn it truly in a turning-lathe, the profile of the exterior being determined for each size and denomination of screws by a suitable templet. The ring is then cut into segments of convenient length, each of which constitutes a tool, and the cutting-edge is produced by grinding off one of the ends of the tool to a suitable cutting-angle.

When the screw-cutting machine with this tool is in operation, screw-cutting is commenced at the part of the thread nearest the head of the screw by advancing the tool against the screw-blank and carrying it longitudinally therewith while the screw-blank is turned. When the tool has been carried longitudinally past the point of the screw-blank, its edge is withdrawn from the screw-blank and it is carried back by the tool-holder to the position whence it started. It is then advanced again a little farther than at first against the screw-blank, and carried lengthwise therewith, as before, and these operations are repeated a greater or less number of times, according to the dimensions of the screw, until the thread is cut to the required depth. When the cutter is first brought in contact with the screw-blank the sloping cutting-edge $e'$ acts as shown at Z, Fig. 4, and as at this time the cutter is advanced against the blank simultaneously with its longitudinal movement, the slope at the upper end of the screw is made gradual. While the cutter is operating upon the body of the screw, between the sloping portions, the square cutting-edge $e$ acts as shown at Y, Fig. 4, and the sloping edge is inoperative. When the cutter is operating at the end of the screw-blank, the tool is again advanced toward the axis of the blank as it is moved lengthwise therewith, so that the sloping cutting-edge, which follows the square edge, comes into action, as shown at Z', Fig. 4, and forms the tapering-point with a suitable slope. The two cutting-edges thus act in succession upon the screw-blank, remove the superfluous material, and cut the thread, imparting to the screw at the same time the desirable tapering form.

In the foregoing description we have described our improvement as embodied in a single tool formed of one piece of metal, but it is obvious that the invention is not limited to this particular construction of tool. Thus, for example, the two cutting-edges $e$ and $e'$ may be formed upon two distinct pieces of metal, and these two may be secured side by side in a single tool-post, so as to constitute a compound tool whose members meet at the dotted line $x\,x$, or each piece or sectional tool thus formed may be fixed in a separate tool-post, to which suitable motions may be imparted to cause the sectional tools to act at proper times upon the revolving screw-blank, so that they do not interfere with each other. In this latter case the sloping cutting-edge $e'$ may be made to operate at the point of the screw only if a screw sloping only at the point is required to be formed. We have also described the tool as curved longitudinally, and we prefer to make it in this form, as it enables it to be adjusted more readily in the machine as it is worn away by grinding; but the tool may be made straight longitudinally if the machine in which it is to be used is adapted to a tool of such longitudinal form.

What we claim as our invention, and desire to secure by Letters Patent, is—

The cutting of the threads of wood-screws by means of chasing-tools whose cutting-edges have profiles which are respectively counterparts of the body and sloping portions of the screws, and which are caused to act in succession upon the screw-blank.

In testimony whereof we have hereunto subscribed our names.

HENRY L. KENDALL.
HOMER P. HUNT.

Witnesses:
NICHOLAS SHELDON,
WM. H. HENDERSON.